United States Patent
Boyer et al.

(10) Patent No.: US 11,687,394 B2
(45) Date of Patent: Jun. 27, 2023

(54) METHOD FOR TESTING A COMPUTER RESET DEVICE

(71) Applicant: Vitesco Technologies GmbH, Regensburg (DE)

(72) Inventors: Jean-Luc Boyer, Toulouse (FR); Xavier Guillaume, Toulouse (FR)

(73) Assignee: Vitesco Technologies GmbH

( * ) Notice: Subject to any disclaimer, the term of this patent is extended or adjusted under 35 U.S.C. 154(b) by 0 days.

(21) Appl. No.: 17/618,645

(22) PCT Filed: Jun. 19, 2020

(86) PCT No.: PCT/EP2020/067077
§ 371 (c)(1),
(2) Date: Dec. 13, 2021

(87) PCT Pub. No.: WO2021/001168
PCT Pub. Date: Jan. 7, 2021

(65) Prior Publication Data
US 2022/0358004 A1    Nov. 10, 2022

(30) Foreign Application Priority Data
Jul. 4, 2019 (FR) ...................................... 1907441

(51) Int. Cl.
*G06F 11/00* (2006.01)
*G06F 11/07* (2006.01)
*G06F 11/22* (2006.01)

(52) U.S. Cl.
CPC ........ *G06F 11/076* (2013.01); *G06F 11/0739* (2013.01); *G06F 11/2284* (2013.01)

(58) Field of Classification Search
CPC ............... G06F 11/076; G06F 11/0739; G06F 11/2284; G06F 11/3013; G06F 11/0754; G06F 11/0757; G06F 11/0766
See application file for complete search history.

(56) References Cited

U.S. PATENT DOCUMENTS

| | | |
|---|---|---|
| 6,356,821 B1 | 3/2002 | Yoshida |
| 6,647,301 B1 | 11/2003 | Sederlund et al. |

(Continued)

FOREIGN PATENT DOCUMENTS

| | | |
|---|---|---|
| JP | 2001063492 A | 3/2001 |
| JP | 2014019416 A | 2/2014 |

OTHER PUBLICATIONS

International Search Report and Written Opinion for International Application No. PCT/EP2020/067077, dated Aug. 27, 2020, with partial English translation, 7 pages.

(Continued)

*Primary Examiner* — Joseph D Manoskey
(74) *Attorney, Agent, or Firm* — RatnerPrestia

(57) ABSTRACT

A method for testing, in situ and in operation, a reset device for resetting a computer, including an execution sequence and a verification sequence, the execution sequence being executed during the running of the piece of software and including the following steps: incrementing a test counter, storing the test counter in a non-volatile memory, triggering a reset of the computer, the verification sequence being executed when starting the piece of software and including the following steps: reading the test counter from the non-volatile memory, comparing the test counter: if it is equal to its initial value increased by 1, resetting the test counter, and the test result is positive; and if it is greater than its initial value increased by 1, the test result is negative.

6 Claims, 3 Drawing Sheets

(56) References Cited

U.S. PATENT DOCUMENTS

| | | | |
|---|---|---|---|
| 9,823,296 B2 | 11/2017 | Thanner et al. | |
| 2012/0041638 A1* | 2/2012 | Johnson | G06F 11/3409 |
| | | | 701/33.1 |
| 2015/0137841 A1 | 5/2015 | Thanner et al. | |
| 2016/0117132 A1 | 4/2016 | Eloy | |
| 2017/0261099 A1* | 9/2017 | Hathaway | F16H 61/0213 |
| 2019/0188084 A1 | 6/2019 | Ledez et al. | |

OTHER PUBLICATIONS

International Search Report and Written Opinion for International Application No. PCT/EP2020/067077, dated Aug. 27, 2020, 11 pages (French).

* cited by examiner

METHOD FOR TESTING A COMPUTER RESET DEVICE

CROSS REFERENCE TO RELATED APPLICATIONS

This application is the U.S. National Phase Application of PCT International Application No. PCT/EP2020/067077, filed Jun. 19, 2020, which claims priority to French Patent Application No. 1907441, filed Jul. 4, 2019, the contents of such applications being incorporated by reference herein.

FIELD OF THE INVENTION

The invention relates to computers in a critical environment, such as computers for controlling engines, and more particularly to a method making it possible to test the correct operation of a device for resetting such a computer.

BACKGROUND OF THE INVENTION

A computer typically comprises hardware and software. The hardware is able to run the software in order to perform a function of controlling a member. It is known practice to secure such a computer by adding to it at least one hardware and/or software module that is able to monitor the correct operation of the computer and, where appropriate, to take protective measures.

As illustrated in FIG. 1, showing an organization used in the automotive industry, according to the VDA standard, a computer 2, such as an engine computer, runs a piece of (level 1) nominal software L1 performing the engine control functions. A first monitoring module, in the form of a piece of (level 2) monitoring software L2, monitors the correct operation of the piece of software L1, in particular by reproducing certain critical computations and by comparing its results with those obtained by the piece of nominal software L1. When L2 detects a problem, L2 implements a protective strategy depending on the problem. Such a protective strategy comprises, in increasing order of the seriousness of the problem: operating in degraded mode, stopping injection or resetting the computer 2.

The degraded mode assumes that the computer 2 and the piece of software L1 maintain certain operating capacities. The piece of software L2 sends a command to switch to degraded mode to the piece of software L1, which executes it. The degraded mode allows degraded operation, for example imposing a reduced speed, of the engine, making it possible to move the vehicle, typically to drive it to a garage.

The purpose of stopping injection is to stop the engine in order to avoid an accident. It is assumed that the computer 2 and/or the piece of software L1 is no longer sufficiently reliable. Therefore, this command, which is decided on by the piece of software L2, is performed by a (level 3) device L3 that is independent of the computer 2 and typically hardware-only (typically an electronic circuit, such as an ASIC), which acts directly on the injectors.

The purpose of the reset, as a last resort, is to reset the computer 2 in the hope of returning both the computer 2 and the piece of software L1 and the piece of software L2 to a nominal state. If the reliability of the computer 2 and/or of the piece of software L1 is questioned, this command, which is generally decided on/triggered by the piece of software L2, is performed by the device L3, which is independent of the computer 2 and acts directly on the computer 2. The device L3 is also able to perform certain tests of whether it, the computer 2 and/or the means of communication between it and the computer 2 are operating correctly. In the event of a fault being detected, the device L3 may decide to trigger a reset.

As this is top-level security, the reset may be critical. It should be verified that the triggering of a reset is operating correctly. It is known practice to test this function after manufacture. Then, according to the prior art, it is generally no longer tested.

SUMMARY OF THE INVENTION

In order to overcome this deficiency, an aspect of the invention provides a method for testing a reset device L3 for resetting a computer 2, which is advantageously usable in situ and even during the operation of the computer 2 and of the member M.

To this end, an aspect of the invention relates to a method for testing, in situ and in operation, a reset device for resetting a computer, said device running at least one piece of reset software, said computer running at least one piece of control software in order to control a member, said method comprising an execution sequence and a verification sequence, the execution sequence being executed during the running of the piece of control software and comprising the following steps: —incrementing a test counter, —storing the test counter in a non-volatile memory, —triggering a reset of the computer, the verification sequence being executed when starting the piece of control software and comprising the following steps: —reading the test counter from the non-volatile memory, —comparing the test counter: if the test counter is equal to its initial value there is no test result; if the test counter is equal to its initial value increased by 1, resetting the test counter, and the result of the test is positive; and if the value of the test counter is different, creating a "reset" error, and the result of the test is negative.

Particular features or embodiments, which may be used alone or in combination, are:

the execution sequence further comprises a step of: —storing a test indicator in a non-volatile memory, and the verification sequence further comprises the following steps: —verifying the presence of the test indicator in the non-volatile memory, resetting the test counter only if the test indicator is present, and removing the test indicator.

the execution sequence further comprises a step of: —storing a reset date in a non-volatile memory, and the verification sequence further comprises the following steps: —reading the reset date from the non-volatile memory, —determining a reset duration from the difference between the reset date and the current date, —comparing the reset duration with a maximum threshold: if the reset duration is greater than the maximum threshold: creating a "duration" error and the result of the test is negative.

the execution sequence further comprises an initial step of: —verifying the state of the member, the other steps of the execution sequence being executed only when the member is inactive.

the member is an internal combustion engine and is inactive when injection is stopped.

the method further comprises a preliminary step of verifying a precondition for its execution, said condition being preferably determined according to at least one criterion from among: calendar duration, operating time of the computer and/or number of operating cycles of the member.

the method further comprises a step of: —turning on at least one warning signal if the result of the test is negative, if the "reset" error is created and/or if the "duration" error is created.

BRIEF DESCRIPTION OF THE DRAWINGS

An aspect of the invention will be better understood on reading the following description, given purely by way of example, and with reference to the appended figures, in which.

DETAILED DESCRIPTION OF THE PREFERRED EMBODIMENTS

Figure 1:
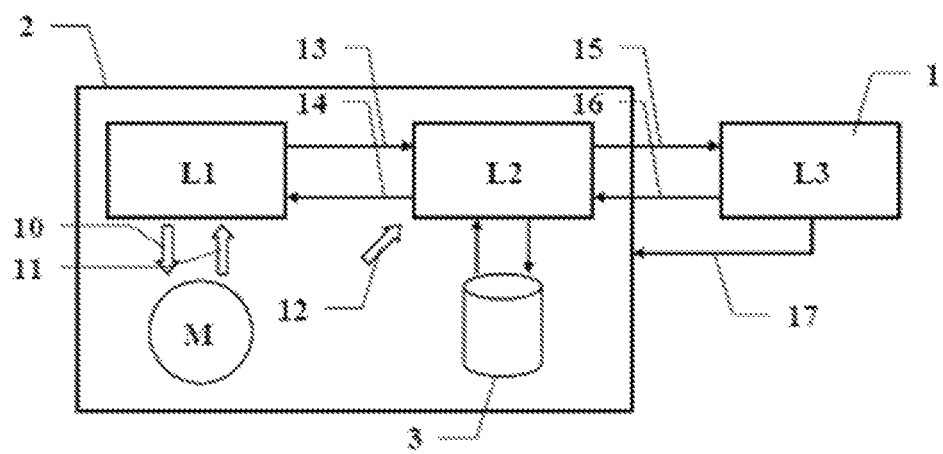
FIG. 1 represents a block diagram of the organization of the computer and of its reset device.

The method according to an aspect of the invention comes into play in connection with a computer 2 as illustrated in FIG. 1. This computer 2 runs at least one piece of software L1, L2, in order to control a member M. The member may for example be an internal combustion engine M and the computer 2 is an engine control computer. The piece of software L1 has sensors 11 in order to observe the state of the member M and actuators 10 in order to influence said state. Due to the possible criticality of the actions commanded by the computer 2, the computer is secure. A first level of security is provided by a piece of monitoring software L2. The piece of monitoring software exchanges information with L1 by means of links 13, 14. It may further be equipped with additional sensors 12. A non-volatile memory 3 makes it possible to record information that is non-volatile when the computer 2 is stopped, by power being cut or else by being reset. As the piece of software L2 and/or the computer 2 may also be faulty, as described above, the computer 2 is equipped with a reset device 1, L3, which is able to reset the computer 2 in the event of a fault being detected. The purpose of the reset is, as a last resort, to reset the computer 2 in the hope of returning both the computer 2 and the piece of software L1 and possibly the piece of software L2 to a nominal state. If the reliability of the computer 2 and/or of the piece of software L1 is questioned, the reset is performed by the device 1, L3, which is independent of the computer 2. The device acts directly on the computer 2 via the means 17, for example by acting on the reset pin of the computer 2. The reset is generally decided on by the piece of software L2 and transmitted via the communication means 15. The communication means 16 makes it possible for the device L3, 1, to inform L2 in return. The device L3 is also able to perform certain tests of whether it, the computer 2 and/or the means of communication 15, 16, 17 between it and the computer 2 are operating correctly. In the event a fault being detected, the device L3 may decide on its own to trigger a reset, still via the means 17.

An aspect of the invention is to verify that the execution of the reset, from it being decided on until the computer 2 returns to an operational state, is proceeding correctly, in order for it to be possible to rely on this security device 1, L3 for security purposes. To this end, an aspect of the invention is to execute a test reset in order to verify that a reset decision does indeed lead to an effective reset of the computer 2. This reset is advantageously performed in situ, the computer 2 being operationally installed, and in operation, the computer 2 and the member M being in operation during the test. Said reset is observed during its execution in order to verify that it is proceeding correctly.

To this end, the test method comprises an execution sequence S1 that is able to command a reset by sending a reset command to the reset device 1. The execution sequence S1 is executed during the running of the piece of software L1, L2. Where appropriate, the method may choose a preferred moment that is more favorable than another.

In addition, the method further comprises a verification sequence S2. This sequence is able to observe the device 1 and/or the computer 2, following the sending of the reset command, in order to verify that the reset command has indeed been executed and that a reset of the computer 2 is following said command and that it is proceeding correctly. To this end, the verification sequence S2 is preferably executed following the (re)start of the piece of software L1, L2. This makes it possible to execute the verification sequence S2 immediately after starting the computer 2 and thus as soon as possible after a restart of the computer 2 that follows a reset.

Both the execution sequence S1 and the verification sequence S2 are advantageously software modules. These modules are functionally level L3 or level L2. They are run by the computer 2 and advantageously triggered by the piece of software L1.

Figure 2:
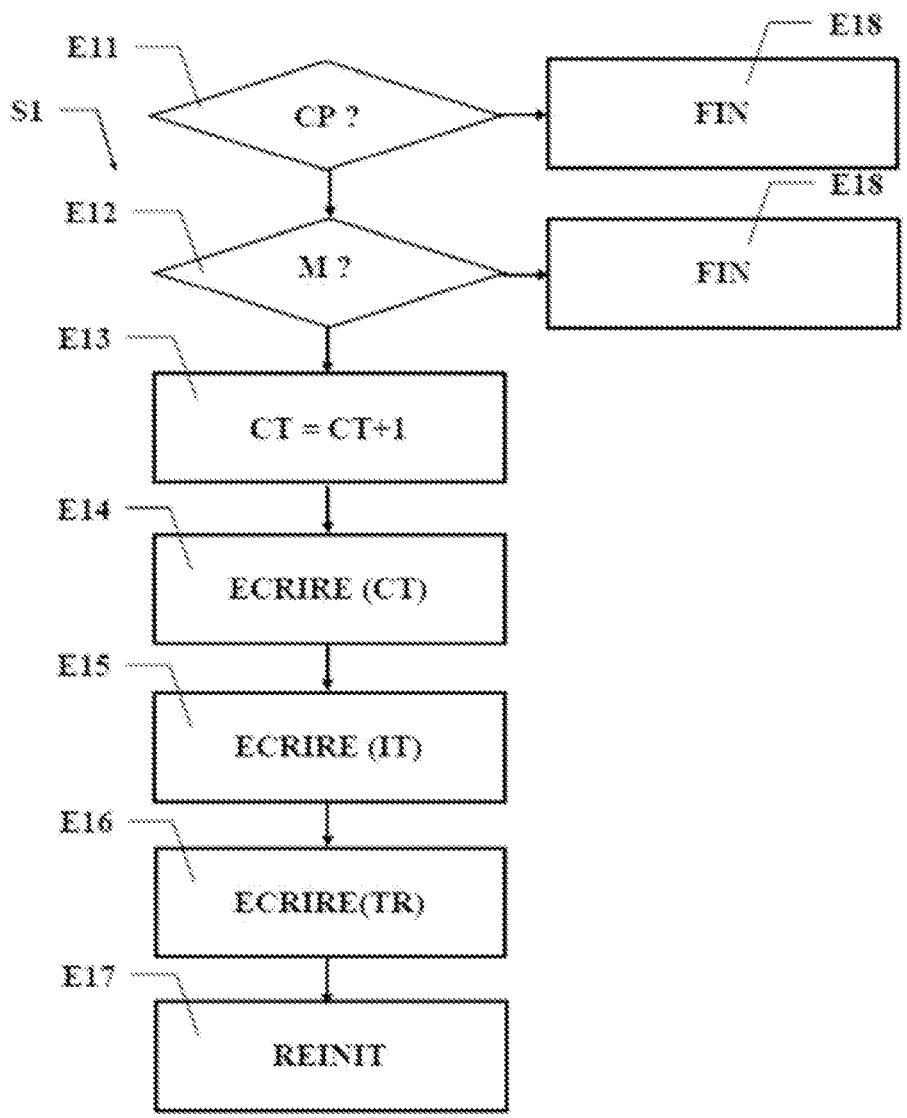
FIG. 2 shows a flowchart of the execution sequence of the method.

FIG. 2 illustrates the execution sequence S1. The computer 2 has its memory erased during a reset. Therefore, before proceeding with a reset, the execution sequence S1 performs one or more steps of storing information. This information is stored in a non-volatile memory 3 in order to be non-volatile. The state of this information, when read again by the verification sequence S2, will make it possible to distinguish a nominal start, a start following a reset test or else an absence of reset when a test had been requested, and thus make it possible to determine a test result.

According to one feature, a step E13 increments a test counter CT. This test counter CT counts the number of reset tests requested by the execution sequence S1. It is then recorded in non-volatile memory 3 during a step E14. The test counter CT is advantageously stored in a permanent non-volatile memory. Then the execution sequence S1 triggers, during a step E17, a reset of the computer 2. This is done by sending a request to the device 1, L3, via the means 15.

The execution sequence S1 is advantageously implemented by a piece of software running on the computer 2. Therefore, the step E17 normally ends the execution sequence S1, if the computer 2 is reset. A step following E17 might show that there is no reset. This option was not adopted by an aspect of the invention.

Figure 3:
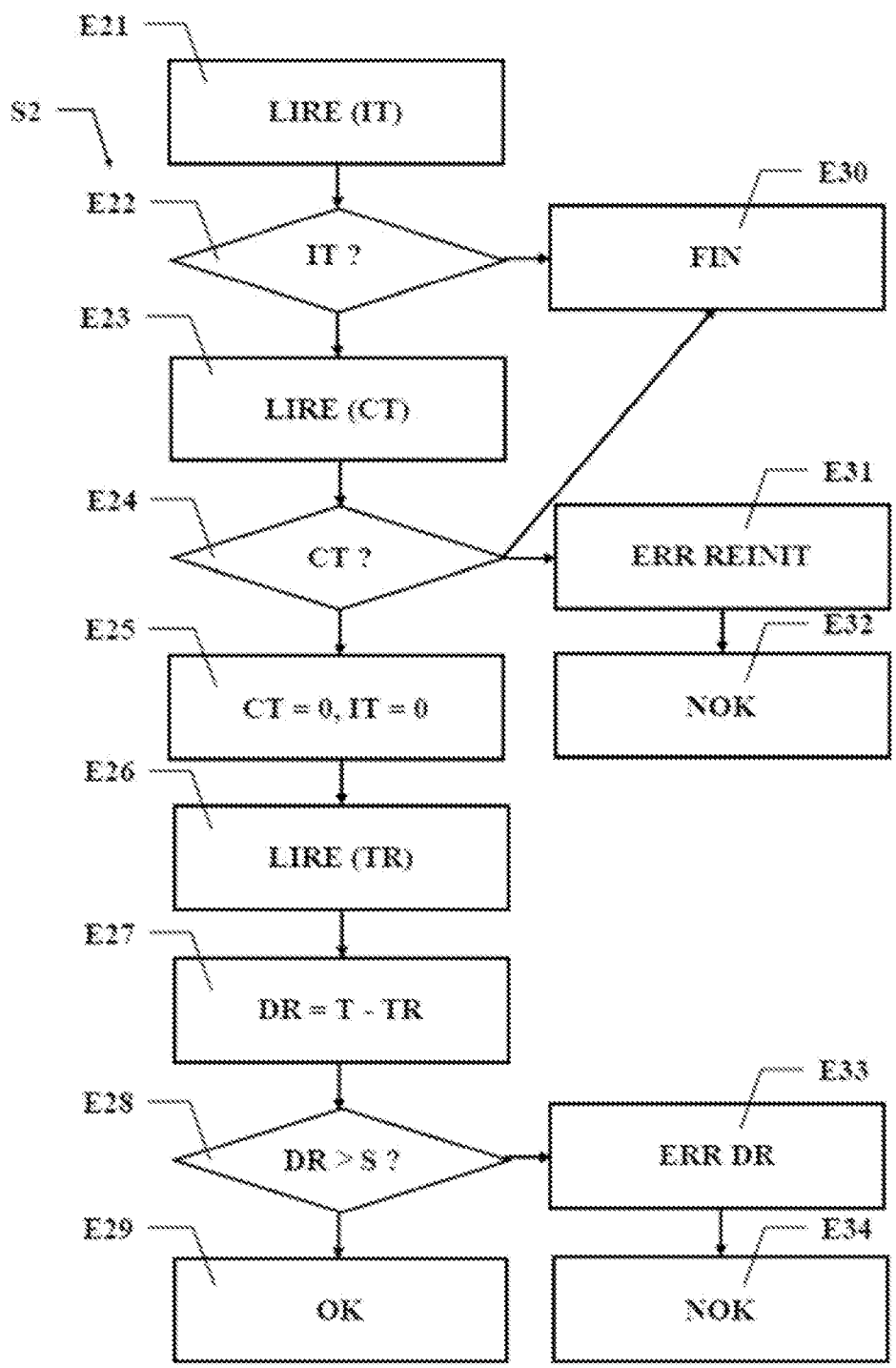
FIG. 3 shows a flowchart of the verification sequence of the method.

According to an aspect of the invention, the verification sequence S2 is responsible for detecting the correct or incorrect operation of the reset. To this end, the verification sequence S2 is executed when starting the computer 2. It comprises the following steps, which are illustrated in FIG. 3. According to one feature, a first step E23 consists in reading, from the non-volatile memory 3, the test counter CT. During a following step E24, this test counter CT is compared with its possible values. If the test counter CT is equal to its initial value, that is to say the value before any incrementation E13, this is indicative of the execution sequence S1 not having been executed beforehand. Therefore, no reset test has yet been requested. Therefore, there can be no test result. The verification sequence S2 may be ended by branching to the terminal step E30. If the test counter CT is equal to its initial value increased by 1, it may be considered that the execution sequence S1 has been executed once and that the restart in progress follows the reset E17 that followed. It may thus be considered that a test has been requested and that it has proceeded correctly. Therefore, in this case, the comparison E24 branches to the step E25, which resets the test counter CT, which resumes its initial value, for example 0. If the test has proceeded correctly, the verification sequence S2 may continue at the step E29 with a positive test result, OK. If the value of the test counter CT is different, and in particular if it is greater than the initial value increased by 1, this results from at least two incrementation operations in a step E13, and therefore from at least two executions of the execution sequence S1 with two triggerings E17 of a reset, without execution following a verification sequence S2. It may be deduced here that at least one of the reset requests E17 which followed an incrementation step E13 was not followed by an effective reset of the computer 2. Otherwise, the test counter CT would have been reset at the step E25. Therefore, in this case, the comparison E24 branches to a step E31 of creating a "reset" error. The verification sequence S2 continues and terminates at the step E32 with a negative test result, NOK.

The test method may further comprise other features, alone or in combination, allowing as many variant embodiments.

According to another feature, the execution sequence S1 further comprises a step E15 of writing/storing a test indicator IT in a non-volatile memory 3. The test indicator IT is advantageously stored in a memory that is not erased during a reset. This test indicator IT typically comprises a piece of data that is present or absent or else a variable containing a certain value. The verification sequence S2 further comprises, in a complementary manner, the following steps. The presence of said test indicator IT is verified by reading E21 the non-volatile memory 3 in search of it. If this test indicator IT is found E22, this confirms that a reset test is in progress. Therefore, a reset E25 of the test counter CT may be performed. During the step E25, the test indicator is then also deleted. Failing this, if no test indicator IT can be found in the non-volatile memory 3, the comparison E22 branches to the step E30, which ends the verification sequence S2. There is no test result in this case. Using a test indicator IT makes it possible to confirm the case where a test has been requested without relying solely on the test counter CT.

According to another feature, the test method is further employed to test, if the reset is executed, that it is executed in a sufficiently short time. To this end, the execution sequence S1 further comprises a step E16 of storing a reset date TR in a non-volatile memory 3. The reset date TR is advantageously stored in a permanent non-volatile memory. This reset date TR is sufficiently close to the reset request E17 to be considered to be the reset start date. The verification sequence S2 further comprises, for its part, the following steps: reading E26 the reset date TR from the non-volatile memory 3 and determining E27 a reset duration DR, from the difference, DR=T−TR, between the reset date TR and the current date T. The current date T is sufficiently close to the moment when the computer 2 and its software become operational again after the reset to be considered to be the reset end date. Therefore, the duration DR may be considered to be the total reset duration, from the reset request E17 until the return to an operational state. The verification sequence S2 advantageously further comprises a step E28 of comparing the reset duration DR with a maximum threshold S. This duration threshold S is typically set in a regulatory or legislative manner. As an indication, the threshold S is a few tens of milliseconds, preferably 150 ms.

If the reset duration DR is greater than the maximum threshold S, the verification sequence S2 branches to a step E33 of creating a "duration" error. The verification sequence S2 continues at the terminal step E34 with a negative test result, NOK. If, on the contrary, the reset duration DR is less than the threshold S, the verification sequence S2 continues at the terminal step E29 with a positive test result.

In order not to interfere with the control of the member M, the moment at which a reset E17 is triggered is preferably chosen when the member M is inactive. This guarantees that the control of the member M is interfered with little or not interfered with by the test, which may thus be performed in situ and during operation. To this end, the execution sequence S1 further comprises a step E12 of verifying the state of the member M. If the member M is active, the verification E12 branches to a step E18 of ending the execution sequence S1. Alternatively, the execution sequence S1 may be put on hold, until the state of the member M becomes inactive. If the member M is or becomes inactive, the execution sequence S1 continues with the performance of the other steps E13-E17, as described above.

In the case where the member M is an internal combustion engine, the engine M is considered inactive when injection is cut off. This corresponds, for example, to a stopped engine M or to a running engine, in a phase of deceleration and/or of release of the accelerator pedal. This ensures that the test is not perceived by the driver or, if it is perceptible, that it is not distracting for the driver.

The reset function must be tested from time to time. However, it is not necessary to reproduce the test too often. Therefore, according to another feature, a precondition CP is verified during a step E11 of the execution sequence S1 before any triggering E17 of a reset. This precondition CP may be determined according to any criterion making it possible to defer execution. Thus, the precondition CP may, for example, be determined on one or more criteria chosen from among: a calendar duration, an operating time of the computer 2 and/or a number of operating cycles of the member M.

If the calendar duration criterion is used, the execution sequence S1 of a reset test and therefore a triggering of a test reset E17 may be executed only if the last test reset E17 was executed longer ago than said calendar duration. A calendar duration may, for example, be one hour, 3 days or else 1 month. Likewise, if the criterion of the operating time of the computer 2 is used, a test reset E17 may be triggered only if the computer has operated for at least the prescribed operating time since the last test reset E17. An operating time may, for example, be one hour, 3 days or else 1 month. Likewise, if the criterion of the number of operating cycles of the member M is used, a test reset E17 may be triggered only if the member M has performed at least said number of operating cycles since the last test reset E17. A number of operating cycles may, for example, be 100. In the case where the member M is an internal combustion engine, a cycle comprises operation between a start and a switch-off of the ignition.

Two or more criteria may be combined by OR and/or AND operators.

According to another feature, the method further comprises a step of turning on at least one warning signal if the result of the test is negative NOK. An individualized warning signal or a single common warning signal may be turned on in the event of a "reset" error and/or in the event of a "duration" error. The one or more warning signals may be visual and/or auditory. In the case of a motor vehicle, the warning signal is advantageously displayed on the dashboard so as to alert the driver.

Advantageously, the turning on of a warning signal is backed up by a record, advantageously dated, preferably in non-volatile memory, for the attention of maintenance teams.

An aspect of the invention has been illustrated and described in detail in the drawings and the preceding description. The description must be considered as illustrative and given by way of example and not as limiting the invention to this description alone. Many variant embodiments are possible.

LIST OF REFERENCE SIGNS

1: reset device, L3,
2: computer,
3: non-volatile memory,
10, 11: inputs/outputs between L1 and member,
12: inputs of L2,
13, 14: means of communication between L1 and L2,
15, 16: means of communication between L2 and L3,
17: reset communication means,
L1, L2: piece of level 1 and level 2 software, respectively,
L3: level 3 reset device,
S1: execution sequence,
S2: verification sequence,
E11-E18: steps of S1,
E21-E34: steps of S2,
M: member,
CP: precondition,
CT: test counter,
IT: test indicator,
TR: reset time,
T: current time,
DR: reset duration.

The invention claimed is:

1. A method for testing, in situ and in operation, a reset device for resetting a computer, said device running at least one piece of reset software, said computer running at least one piece of control software in order to control a member, comprising an execution sequence and a verification sequence, the execution sequence being executed during the running of the piece of control software and comprising:
    incrementing a test counter,
    storing the test counter in a non-volatile memory,
    triggering a reset of the computer,
the verification sequence being executed when starting the piece of control software and comprising:
    reading the test counter from the non-volatile memory,
    comparing the test counter: if the test counter is equal to its initial value there is no test result; if the test counter is equal to its initial value increased by 1, resetting the test counter, and the result of the test is positive; and if the value of the test counter is different, creating a "reset" error, and the result of the test is negative,
    wherein the execution sequence further comprises:
    storing a test indicator in a non-volatile memory,
and the verification sequence further comprises:
    verifying the presence of the test indicator in the non-volatile memory, resetting the test counter only if the test indicator is present, and removing the test indicator.

2. The method as claimed in claim 1, further comprising a preliminary step of verifying a precondition for its execution, said condition being preferably determined according to at least one criterion from among: calendar duration, operating time of the computer and/or number of operating cycles of the member.

3. A method for testing, in situ and in operation, a reset device for resetting a computer, said device running at least one piece of reset software, said computer running at least one piece of control software in order to control a member, comprising an execution sequence and a verification sequence, the execution sequence being executed during the running of the piece of control software and comprising:
    incrementing a test counter,
    storing the test counter in a non-volatile memory,
    triggering a reset of the computer,
the verification sequence being executed when starting the piece of control software and comprising:
    reading the test counter from the non-volatile memory,
    comparing the test counter: if the test counter is equal to its initial value there is no test result; if the test counter is equal to its initial value increased by 1, resetting the test counter, and the result of the test is positive; and if the value of the test counter is different, creating a "reset" error, and the result of the test is negative,
    wherein the execution sequence further comprises:
    storing a reset date in a non-volatile memory,
and the verification sequence further comprises:
    reading the reset date from the non-volatile memory,
    determining a reset duration from the difference between the reset date and the current date, and
    comparing the reset duration with a maximum threshold: if the reset duration is greater than the maximum threshold: creating a "duration" error and the result of the test is negative.

4. The method as claimed in claim 3, further comprising:
    turning on at least one warning signal if the result of the test is negative, if the "reset" error is created and/or if the "duration" error is created.

5. A method for testing, in situ and in operation, a reset device for resetting a computer, said device running at least one piece of reset software, said computer running at least one piece of control software in order to control a member, comprising an execution sequence and a verification sequence, the execution sequence being executed during the running of the piece of control software and comprising:
    incrementing a test counter,
    storing the test counter in a non-volatile memory,
    triggering a reset of the computer,
the verification sequence being executed when starting the piece of control software and comprising:
    reading the test counter from the non-volatile memory,
    comparing the test counter: if the test counter is equal to its initial value there is no test result; if the test counter is equal to its initial value increased by 1, resetting the test counter, and the result of the test is positive; and if the value of the test counter is different, creating a "reset" error, and the result of the test is negative,
    wherein the execution sequence further comprises an initial step of:
    verifying the state of the member, the other steps of the execution sequence being executed only when the member is inactive.

6. The method as claimed in claim 5, wherein the member is an internal combustion engine and is inactive when injection is stopped.

* * * * *